United States Patent [19]

Fenton

[11] Patent Number: 4,901,778
[45] Date of Patent: Feb. 20, 1990

[54] SYSTEM FOR REPLACING FEEDROLL INSERTS

[76] Inventor: David S. Fenton, General Delivery, Grovedale, Alberta, Canada, T0H 1X0

[21] Appl. No.: 282,637

[22] Filed: Dec. 12, 1988

[51] Int. Cl.$^4$ ............................................. B27G 13/00
[52] U.S. Cl. ................................. 144/230; 144/218; 144/246 R; 144/246 F; 198/624; 198/692
[58] Field of Search .................... 409/40, 41, 49, 50, 409/108; 144/218, 230, 246 R, 246 C, 246 F, 208 R, 208 E; 198/624, 692

[56] References Cited

U.S. PATENT DOCUMENTS

| | | | |
|---|---|---|---|
| 87,985 | 3/1869 | Stephens | 144/230 |
| 133,775 | 10/1872 | Hale | 144/230 |
| 447,900 | 3/1891 | Pallen | 407/50 |
| 1,960,319 | 5/1934 | Severson | 407/50 |
| 2,407,921 | 9/1946 | Deliso | 407/49 |
| 2,810,189 | 10/1957 | See et al. | 407/50 |
| 3,014,511 | 12/1961 | Kirsten | 144/230 |
| 4,743,307 | 5/1988 | Mason | 407/49 |

Primary Examiner—W. Donald Bray
Attorney, Agent, or Firm—E. Peter Johnson

[57] ABSTRACT

A system is provided for installing, retaining and replacing the saw-teeth strip inserts of rotatable, cylindrical feedrolls, without concomitant damage thereto. More specifically, a plurality of circumferentially spaced, longitudinally extending grooves are formed in the body of the feedroll. Each groove is adapted to receive a pair of spaced, parallel saw-teeth strip inserts and maintain them at a predetermined position therein. A wedge is insertable into the groove between the inserts. The wedge is adapted to abut the lower portion of the inserts to clamp them against the groove side walls. A plurality of fasteners, such as allen head screws, are inserted through spaced, aligned bores formed in the wedge and are secured in the groove floor. The fasteners function to releasably secure the saw-teeth strips and wedge within the groove.

5 Claims, 3 Drawing Sheets

SYSTEM FOR REPLACING FEEDROLL INSERTS

FIELD OF THE INVENTION

The present invention relates to rotatable feedrolls for conveying lumber, logs, or the like. More particularly it relates to feedrolls provided with radially projecting inserts comprising longitudinally extending strips having upstanding saw-teeth, spikes, blades or the like. The strips of saw teeth, spikes, blades or the like (hereinafter referred to as the 'inserts') are positioned in uniformly spaced apart relationship around the periphery of the feedroll.

BACKGROUND OF THE INVENTION

Typically, saw-teeth are required on the feedrolls used in lumber mills in order that cants (or squared-off logs which have two opposed planar surfaces) may be securely gripped for accurately positioned feeding into a band saw or saw cluster.

At present, in commercial operations, the saw-teeth are available in short strips of the various lengths. One or more strip lengths, depending on the length of the feed roll, are forced into a tight-fitting groove in the body of the feedroll by hammering or pinch clamping. The saw-teeth become blunted and ineffective after about six months to a year's use and require replacement. In order to replace the worn saw-teeth, it is necessary to first remove the feedroll from the machine. The technique for removing the inserts involves manually (or less commonly, pneumatically) chiselling the inserts out of the groove. Manual chipping is slow and inflicts damage to the groove. Pneumatic removal poses potential hazards to the operators due to the danger of flying metal fragments. Replacement of an insert can only be conducted by the conventional manual technique about three times before excessive damage to the groove has resulted. Usually at this point the saw-teeth strips are welded into the groove, for a final usage and upon dulling of these welded teeth the whole feedroll usually is discarded.

A search of the prior art has located the following patents of interest. U.S. Pat. No. 4,509,574 issued to W. M. Gaitten, teaches an improvement in a debarking machine wherein feed roll spikes having plus-shaped cutting edges are provided. R. A. Schmidt, in U.S. Pat. No. 4,385,650 describes an improved feed roll for logs which is provided with a plurality of radially extending trapezoidally shaped pyramids spaced circumferentially about the surface.

There still exists, therefore, the need for a system for removing and replacing saw-teeth strip inserts which would provide the following:
  extension of the feedroll life, as replacement of the entire discarded feedroll per se is costly
  a speedier replacement, because the present method is both labour intensive and slow;
  reduction in potential injury to operators which can occur when replacement of the teeth is conducted in accordance with the prior art methods; and
  elimination of the requirement of removing the feed roll from the machine when tooth replacement is necessary.

SUMMARY OF THE INVENTION

In accordance with the present invention there is provided a novel system for installing, retaining and replacing the inserts used in conjunction with grooves formed in the body of a feedroll, whereby substantially no damage to the grooves results during replacement of the inserts.

Preferably, a longitudinally extending groove is formed in the peripheral surface of the feedroll body. The groove is adapted to receive a pair of parallel inserts. In one form the inserts may comprise a saw-teeth strip. In alternative embodiments, the inserts may comprise a flat, elongate bar having upstanding spikes, blades or the like formed or positioned thereon. The surface of the groove is configured to support the inserts so that they protrude a predetermined extent from the body in spaced relationship one to another. The groove is further adapted to receive an elongate wedge between the inserts. The wedge is substantially coextensive with the length of the feedroll. The depth of the wedge is limited so as to leave a gap between its base and the floor of the groove. The upper surface of the wedge preferably is substantially flush with the outer surface of the feedroll body. The upper portions of the sides of the wedge are specifically angled so as to abut and conform with the lower portions of the inserts, clamping them against the side walls of the groove. Bores extending through the depth of the wedge are provided at spaced intervals along its length. A plurality of fastener members, such as allen head screws, are provided to extend through the wedge bores and into aligned threaded bores formed in the feedroll body. Preferably, a cement may be utilized to more firmly secure the shanks of the fasteners within the feedroll body to ensure that they do not become unfastened. The fasteners and wedge cooperate to releasably secure and clamp the pair of spaced, parallel protruding inserts within the groove.

In a most preferred embodiment, when the inserts comprise a saw-teeth strip, the included angle of the wedge side walls should be about 21° and the included angle of the groove walls should be about 20°.

The advantages derived from the above-described system are as follows:
  by elimination of the hammering in of the inserts and subsequent chipping out, no damage to the groove results and consequently the life of the feedroll is extended;
  by facilitating the replacement of the inserts, not only is there a significant saving in labour costs but operators are inclined to change the inserts more frequently and thereby run the feedrolls and mechanisms associated therewith more efficiently; and
  the safety hazards associated with the prior art methods have been lessened.

Broadly stated, the invention is a feedroll for conveying lumber or the like, comprising: a cylindrical body; said body forming a plurality of outwardly opening longitudinally extending, spaced apart grooves; at least one insert, positioned in each groove; the surface of the groove being configured so as to support the insert so that a portion thereof protrudes from the peripheral surface of the body; and means, positioned within the groove and releasably secured to the body, for clamping the insert against the side wall of the groove to retain it in place.

DESCRIPTION OF THE PREFERRED EMBODIMENT

Figure 1:
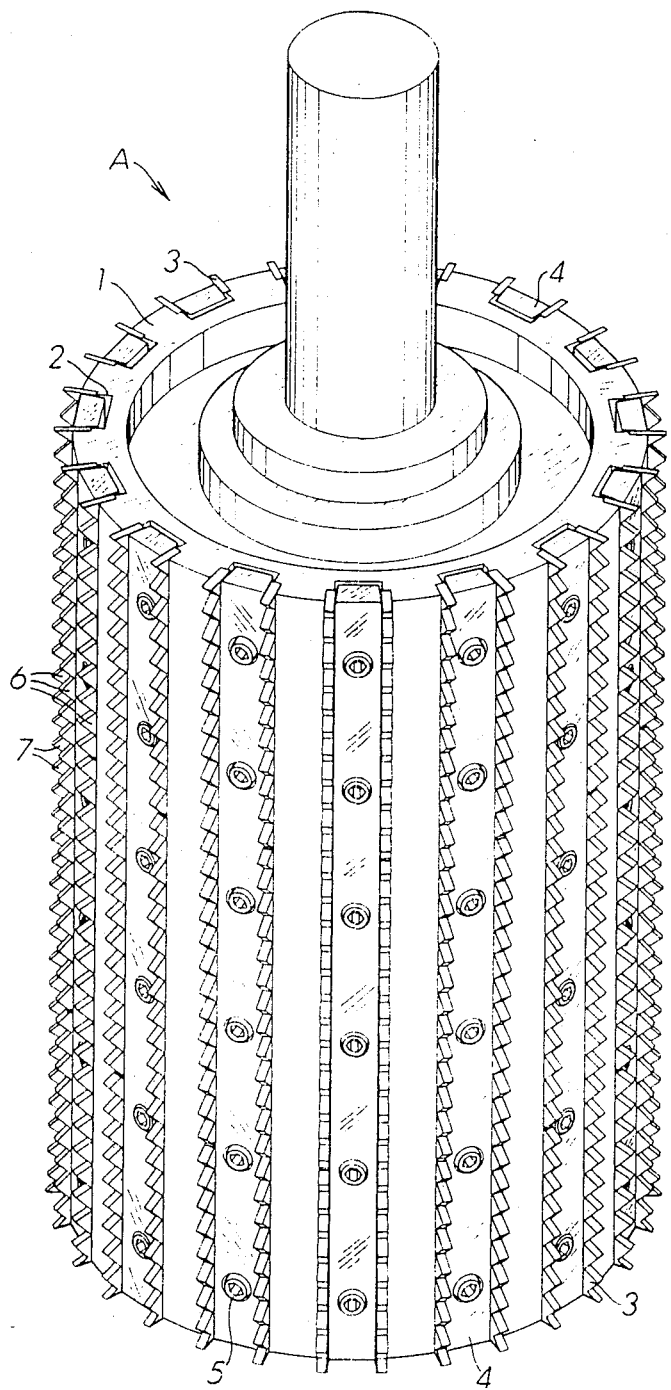
FIG. 1 is a perspective view of a feedroll showing the inserts in place.
Figure 2:
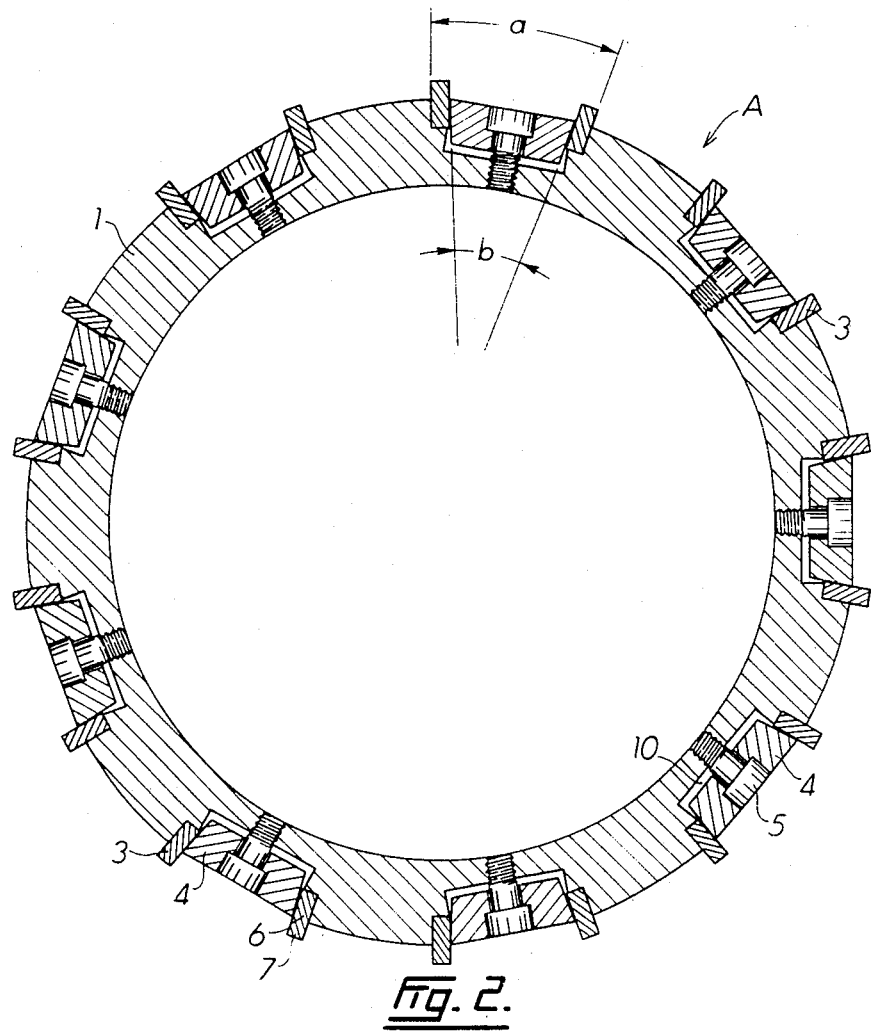
FIG. 2 is a sectional view of the feedroll.

Having reference to the accompanying figures, and in particular to FIGS. 1 and 2, there is illustrated a feedroll A having a cylindrical body 1 forming a plurality of grooves 2 adapted to receive the inserts 3 which are clamped into the groove by means of a wedge 4, the latter being releasably secured in the groove 2 by means of allen head screws 5.

The inserts 3 are an off-the-shelf item comprising an elongate base or strip 6 having saw-teeth 7.

Figure 3:
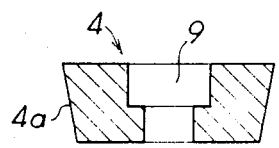
FIG. 3 is a sectional view of the wedge.
Figure 4:
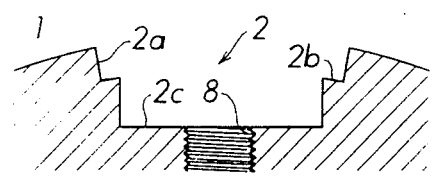
FIG. 4 is a partial sectional view showing a groove formed in the body.

The grooves 2 are milled in the body 1 of the feedroll A. The grooves 2 extend the length of the feedroll A at uniformly spaced locations around its peripheral surface. As illustrated in FIG. 3, the upper portions of the groove side walls 2a are tapered inwardly towards the centre of the groove 2. The preferred included angularity (a) of the upper portions 2a is 20°, but this included angularity could range from between 15° to 30°. A shoulder 2b projects inwardly from each side wall 2a and is configured so as to support the inserts 3 so that they protrude a predetermined extent from the body in spaced parallel relationship to one another.

The floor 2c of the groove 2 is generally horizontal. Threaded bores 8 adapted to receive the shanks of the allen head screws 5 are formed in the groove floor 2c at spaced intervals along its length.

An elongate wedge 4, coextensive with the length of the groove 2, is utilized. The upper portions of the sides 4a of the wedge 4 are specifically angled so as to abut and conform to the lower portions of the inserts 3. Preferably, the included angle of the sides of the wedge 4 is 21° but could range from between 15° to 30°. The difference between the side walls 2a of the groove 2 and the sides of the wedge 4a should not exceed 2°. If it does the wedge 4 will not clamp the inserts 3 as securely. Stated otherwise the angularity of the side walls of the wedge 4a may be equal to, or up to 2° greater than the groove walls 2a in angularity.

I have determined that if the included angularity (b) of the side walls 4a of the wedge 4 is 21° and that of the side-walls 2a of the groove 2 is 20°, then the wedge most effectively clamps or abuts the lower portion of the inserts 3 maintaining them in the desired position. Thus the risk of the inserts 3 popping out of the groove 2, or becoming so firmly lodged within the groove 2 that they have become irremovable is virtually eliminated.

The wedge 4 further forms, at spaced intervals along its length, a plurality of vertical counterbores 9 through which the allen head screws 5 may extend.

As stated earlier, allen head screws 5, releasably secure the wedge 4 within the groove 2. Optionally, a sealing cement may be used to ensure that the allen head screws 5 do not become unfastened.

The depth of the wedge 4 is limited so as to leave a gap 10 between its base and the floor of the groove 2c. It is believed that as result of this provision, the inserts 3 are more firmly gripped due to the action of a laterally directed force rather than a downwardly directed force.

Figure 5:
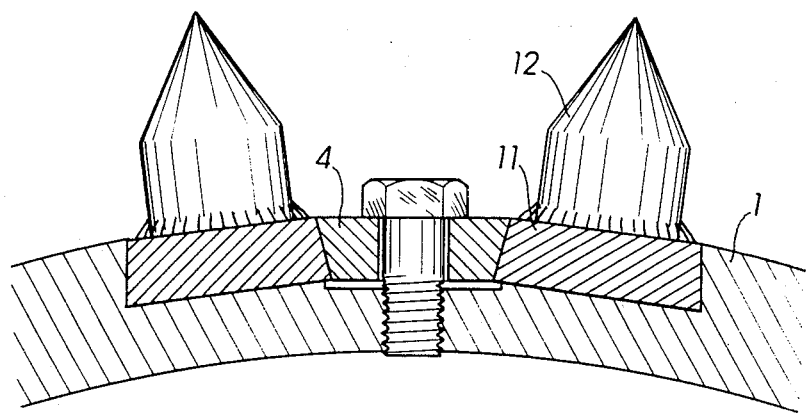
FIG. 5 is a sectional view of an alternative embodiment wherein the inserts comprise spikes welded to a flat bar.

An alternative embodiment which is shown in Figure 5 provides inserts comprising a flat bar 11 having upstanding spikes 12 welded thereto. The angularity of the sides of the bar 9 may range from 5° to 10° degrees and the angularity of the sides of the wedge 11 ranges from 10° to 20°. This design finds particular application in debarker feedrolls.

The embodiments of the invention in which an exclusive property of privilege is claimed are defined as follows:

1. A feedroll for conveying lumber or the like, comprising:
    a cylindrical body;
    said body forming a plurality of outwardly opening longitudinally extending, spaced apart grooves;
    at least one insert positioned in each groove;
    the surface of each of the grooves being configured so as to support the insert so that a portion thereof protrudes from the peripheral surface of the body;
    a wedge positioned in each of the grooves, said wedge engaging the lower portion of each insert to clamp it against the adjacent side wall of the groove; and
    a releasable fastener securing the wedge to the body.

2. The feedroll as set forth in claims 1 or 2 wherein said insert comprises a strip having upstanding saw-teeth, a flat bar having at least one upstanding spike positioned thereon or a flat bar having at least one upstanding blade mounted thereon.

3. A feedroll for conveying lumber or the like, comprising:
    a cylindrical body;
    said body forming a plurality of outwardly opening, longitudinally extending, spaced apart grooves;
    a pair of inserts, each comprising a strip having upstanding saw-teeth, positioned in each groove adjacent the side walls thereof;
    the surface of each of the grooves being configured so as to support the inserts so that the saw-teeth protrude from the peripheral surface of the body;
    a wedge positioned in the groove between the inserts, said wedge engaging the lower portion of each insert to clamp it against the adjacent side wall of the groove; and
    a bolt securing the wedge to the body.

4. The feedroll as set forth in claim 2 wherein the wedge side wall abutting said insert has an included angle of between about 15° to 30° degrees and the wall of the groove forms an included angle between about 15° to 30° and where the angular difference between the wedge side wall and the groove wall does ot exceed between about 0° and 2° degrees.

5. The feedroll as set forth in claim 3 wherein the included angle of the wedge wall is about 21° and the included angle of the groove wall is about 20°.

* * * * *